Sept. 24, 1963 L. R. HARPER 3,105,144

MAGNETIC CORE ADDER

Filed Nov. 4, 1959 9 Sheets-Sheet 1

INVENTOR.
LEONARD ROY HARPER

BY

Edward A. Robinson

ATTORNEY

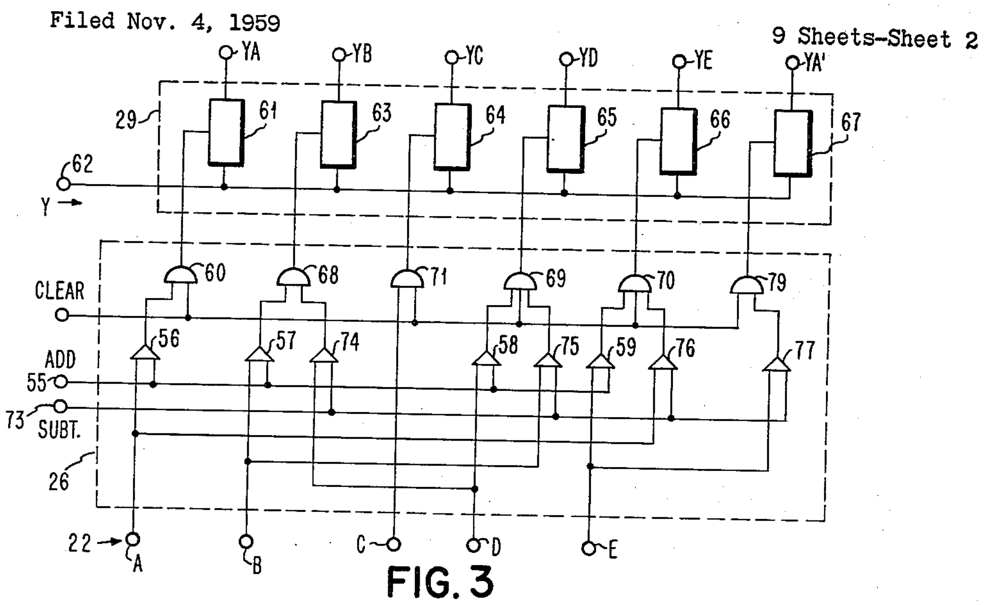
FIG. 3
| | A | B | C | D | E |
|---|---|---|---|---|---|
| 0 | 1 | | | | 1 |
| 1 | | 1 | | | 1 |
| 2 | 1 | 1 | | | |
| 3 | 1 | | 1 | | |
| 4 | | 1 | 1 | | |
| 5 | | 1 | | 1 | |
| 6 | | | 1 | 1 | |
| 7 | | | 1 | | 1 |
| 8 | | | | 1 | 1 |
| 9 | 1 | | | 1 | |
FIG. 2
FIG. 4
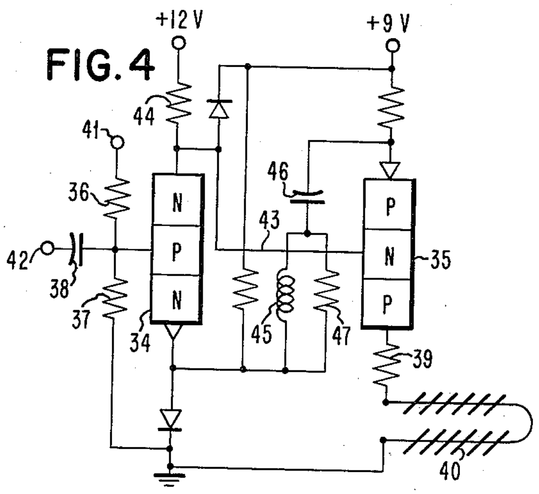
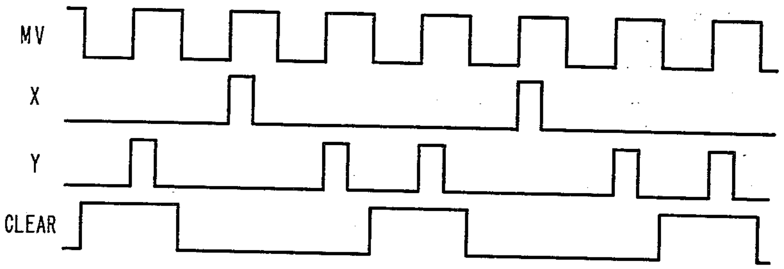
FIG. 5

Sept. 24, 1963 L. R. HARPER 3,105,144

MAGNETIC CORE ADDER

Filed Nov. 4, 1959 9 Sheets-Sheet 3

Sept. 24, 1963 L. R. HARPER 3,105,144

MAGNETIC CORE ADDER

Filed Nov. 4, 1959 9 Sheets-Sheet 5

DRIVE WINDINGS D

DRIVE WINDINGS E

SENSE WINDING A

SENSE WINDING B

SENSE WINDING C

SENSE WINDING D

MAGNETIC CORE ADDER

Filed Nov. 4, 1959 9 Sheets-Sheet 8

United States Patent Office 3,105,144
Patented Sept. 24, 1963

3,105,144
MAGNETIC CORE ADDER

Leonard Roy Harper, San Jose, Calif., assignor to International Business Machines Corporation, New York, N.Y., a corporation of New York Filed Nov. 4, 1959, Ser. No. 850,955
8 Claims. (Cl. 235—176)

This invention relates to electronic computing circuits and more particularly to such a circuit using a matrix of magnetic cores for performing the arithmetic operations of addition and subtraction.

Heretofore, magnetic cores have been used as bi-stable devices for storing information and performing logical functions. A theoretically perfect core would be formed from a material having the magnetic property of a substantially rectangular hysteresis loop. When such a core is threaded with a straight through or single turn winding, a reset current pulse of a predetermined value, hereafter called "full select current," passed through that winding would establish a residual magnetic flux within the core having a polarity which is determined by the direction of current flow through the winding and the core. The core may then be "flipped" or have its residual magnetism reversed by current flowing in the opposite direction through the same or other windings of the core, but in the opposite direction or polarity to the reset current. To select and flip a core the total current requirement remains as in the initial resetting operation (full select current) and a current which is substantially less than this value will fail to overcome the residual magnetism and will therefore fail to flip the core.

A common method for selecting and flipping cores with a minimum of switching, lies in the use of "half-select" currents which may be simultaneously applied to two or more windings of a core matrix which are arranged such that the desired core receives a total current of sufficient strength to reverse the residual magnetism therein. Those cores which receive only a single half-select pulse of current, will remain substantially unaffected. Although cores which are now commercially available may not be ideally perfect in having a completely rectangular hysteresis loop, the magnetic characteristics are sufficiently good to permit half-select switching logic as described above.

Since magnetic cores are binary devices, each core may be used to store the numbers "zero" or "one" in accordance with a binary code. When it is desired to perform arithmetic or logical operations upon decimal numbers with binary devices, it is necessary to use combinations of such devices with circuits capable of passing combinations of bits in a code to represent the decimal numbers. Certain of such codes are the "two-out-of-five bit" codes wherein five channels are provided each for passing binary bits and wherein a selected two of the bits may be "ones" and the three remaining bits will be "zeros."

An object of this invention is to provide an improved circuit for performing additions of numbers represented by a two-out-of-five bit code and for producing a sum signal likewise in this two-out-of-five bit code.

A further object of this invention is to provide a magnetic core matrix arrangement capable of receiving coded input signals representative of two numbers to be added and capable of providing an output signal similarly coded to represent the sum of the two numbers.

A further object of this invention is to provide improved apparatus for selectively adding or subtracting numbers coded in a two-out-of-five bit code and further providing an arrangement for selectively developing the tens complement of a number such that the two numbers may be added directly, or one number may be subtracted from the other by first complementing, then adding, and then recomplementing the result.

Another object is to provide a magnetic core matrix with an improved arrangement of drive windings whereby a row or column of cores may be selected and flipped by applying half-select currents to a selected two of the five drive windings in accordance with a two-out-of-five bit code.

Another object is to provide a core matrix with an improved arrangement of sense windings whereby a reversal of magnetic flux in a particular core will cause induced voltage pulses in two of five sum sense windings such that a decimal sum is indicated in the two-out-of-five bit code.

A further object is to provide an improved sense amplifier circuit which will sense the polarity of voltage pulses and which will respond to the presence or absence of a "carry" from the addition of a prior order of digits. The sense amplifier will pass the voltage pulses directly to corresponding output circuits when no carry is present and will switch voltage pulses of a predetermined polarity to different output circuits when a carry is present.

The foregoing and other objects, features and advantages of the invention will be apparent from the following more particular description of a preferred embodiment of the invention, as illustrated in the accompanying drawings.

In the drawings:

FIG. 2 is a table illustrating a two-out-of-five bit "walking code" which is used for representing the ten decimal digits in five binary bits.

FIG. 3 is a circuit diagram for both the add-subtract gating circuits and the core drive circuits which are shown as blocks in FIG. 1.

FIG. 4 is a complete circuit diagram of a single shot multivibrator used as a core drive circuit and shown by blocks in FIG. 3.

FIG. 5 is a timing chart illustrating the signal pulses which are generated by a timing pulse generator of FIG. 1.

Figure 1:
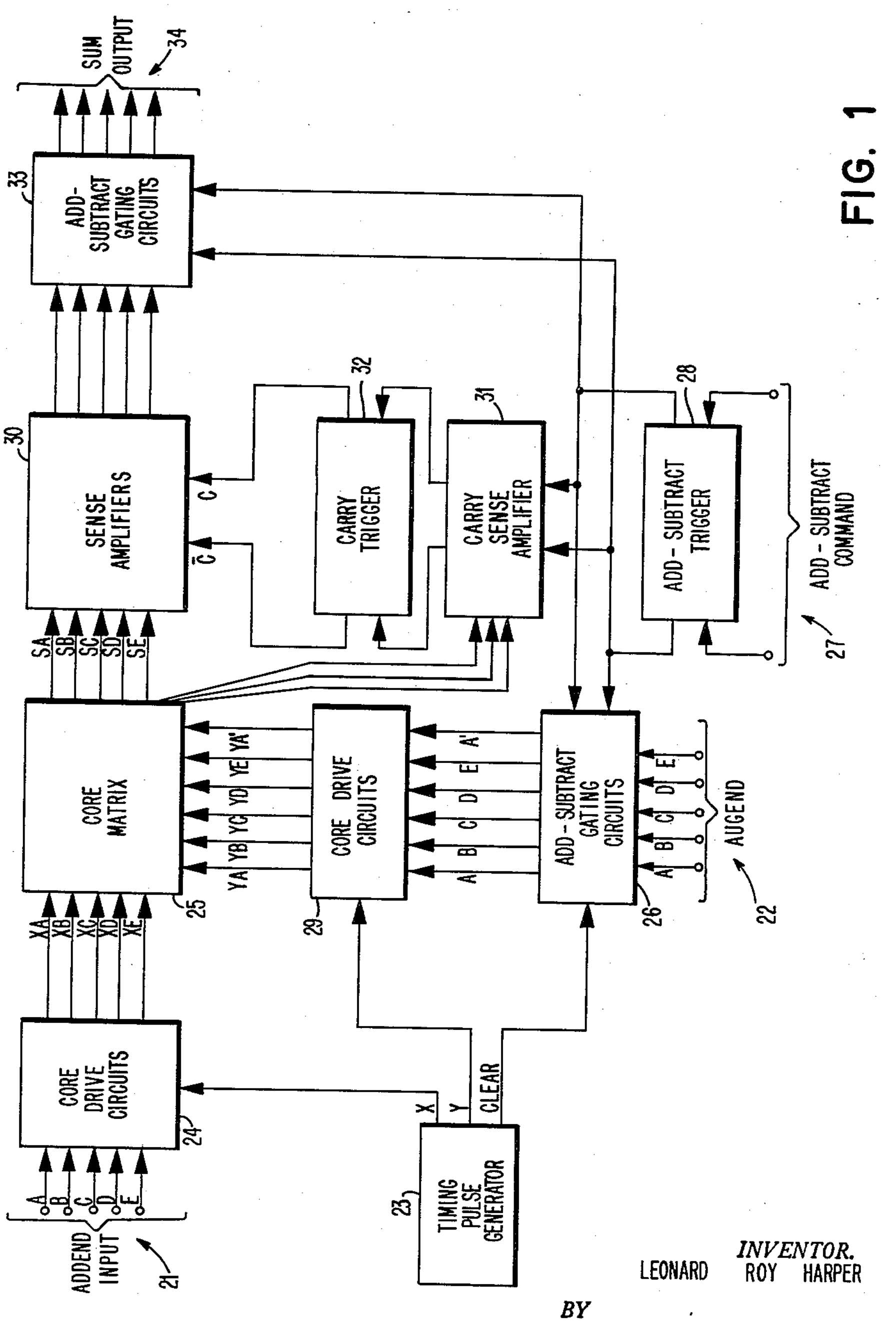
FIG. 1 is a block diagram illustrating the circuit for adding or subtracting numbers in accordance with this invention.

Briefly stated, and with reference to FIG. 1, two numbers to be added or subtracted are entered in the addend input 21 and the augend input 22 each of which include five parallel circuits for passing bit information in a two-out-of-five bit code. At a time determined by a pulse generating circuit 23, simultaneous current pulses are developed in core drive circuits 24 and passed to a matrix of magnetic cores 25. The coded pulses from the core drive circuits 24 produce simultaneous select currents on a selected two of the five horizontal inputs to the core matrix indicated as XA, XB, XC, XD and XE and cause the selection and flux reversal in a single row of cores of the matrix by a drive winding arrangement to be discussed later. The coded signals of the augend input 22 are complemented by add-subtract gating circuits 26, or are passed directly through the add-subtract gating circuit according to a command received at an add-subtract command input 27 and the corresponding voltages impressed upon the gating circuits 26 by an add-subtract trigger circuit 28. The direct augend signals or the complemented augend signals as the case may be, are converted into two simultaneous half-select current pulses by core drive circuits 29 which are passed to the columns of the core matrix by a selected two of the leads YA, YB, YC, YD, YE or YA′, and will cause the cores of a selected column of the core matrix 25 to be restored to an initial state of residual flux. Since but one core of the selected column is in a reversed state of flux, that core only will be reversed and restored to its initial state by the input core drive circuit.

The restoration of the initial flux of the selected core will cause induced current pulses in two of the five sensed windings SA, SB, SC, SD, and SE which constitutes a coded representation of the sum of the numbers entered into the core matrix. An arrangement of sense windings in the core matrix will be discussed later.

The sum output from the core matrix is impressed upon sense amplifying circuits 30 which may be modified by the presence of a "carry." The core matrix includes further sense windings to produce a "carry" or a "no-carry" which is impressed upon a carry sense amplifying circuit 31 and causes a carry trigger 32 (a conventional flip-flop or bi-stable multivibrator) to assume a conduction state indicative of carry or no-carry, and to store the carry information for modification of sum signals which may be generated in a next higher order of digits. Another add-subtract gating circuit arrangement 33 will either pass the sum signals from the sense amplifier 30 directly to a sum output 34 or will cause a further complementing operation depending upon the condition of the add-subtract trigger 28 indicating whether the operation is to be addition or subtraction.

The two-out-of-five digit code is illustrated in FIG. 2 wherein the decimal numbers zero through nine are listed in a first column and the corresponding binary bit representations are shown in the other five columns which are indicated as A, B, C, D, and E and correspond to the five parallel circuits or channels necessary to pass the coded signals. It may be appreciated that each of the ten decimal digits is represented by "ones" in two of the five columns corresponding to bit voltages which are passed over two of the five circuits. The remaining three circuits for each decimal digit remains at a normal or zero level and is indicated in FIG. 2 merely by the absence of any positive designation. The two-out-of-five bit code shown in FIG. 2 is sometimes referred to as the "walking code" since a definite pattern of steps or changes occurs as the decimal numbers increase in value. Column E and column A may be considered adjacent to each other, such that the A, B, C, D and E columns close upon each other, and we may note that the decimal zero is represented by two one bits which are in adjacent circuits or columns, A and E. When we count from zero to one the more forward or leading bit steps off away from the lagging bit such that there is a column separation between the one bits. As we continue to count to the next decimal digit two, we note that the lagging bit steps up to the column immediately behind the leading bit. As we continue to count down the decimal digits, we notice that in each pair of operations the leading bit always steps away from the lagging bit and thence the lagging bit steps up to the leading bit. The zero follows the nine in a natural continuation of the stepping or walking operations without any discontinuity.

The timing pulse generating circuits 23 (FIG. 1) may be conventional multivibrators and single shot or monostable multivibrator circuits and may be sufficiently understood for purposes of this specification by considering FIG. 5. The first curve of FIG. 5, MV, may be produced by a free running multivibrator or square wave generating circuit. The second curve illustrates the X-timing pulses which may be produced by a single shot or monostable multivibrator and a counter such that a short duration pulse is generated with the leading edge of each third MV pulse. The timing pulses Y shown by the third curve of FIG. 5 are similar to the X-pulses but occur twice during every three cycles of the multivibrator and are inhibited during the times when the X-pulse is being generated. A longer voltage pulse, the last curve of FIG. 5, functions to clear the core matrix prior to each addition or subtraction operation and is arranged to produce a positive voltage at a time when every second Y-pulse appears.

The core drive circuits indicated by the block 24 (FIG. 1) may be understood by reference to FIG. 4 which illustrates a single shot multivibrator capable of producing a current pulse of short duration for half-select of the cores of the matrix 25. The block 24 of FIG. 1 would include five circuits according to FIG. 4, one for each of the five bit channels. The single shot circuit of FIG. 4 includes a pair of complementary transistors 34 and 35, an input gate including a pair of resistors 36, 37 and a condenser 38 and an output load circuit including a resistor 39 and a number of cores illustrated generally as 40 but which actually are a part of the core matrix 25. Normally, both the transistors 34 and 35 are non-conductive and therefore no current flows through the load circuit and the cores 40. An input terminal 41 coupled to receive the addend input voltages, corresponds to one of the terminals A, B, C, D, or E in the addend input 21 (FIG. 1). An input terminal 42 is connected to receive the X-pulse from the timing pulse generator 23 which will bias the transistor 34 into conduction provided that the input 41 is conditioned by an appropriate positive input voltage representative of a "one bit." Therefore, the input elements 36, 37 and 38 may be considered to be AND circuits or gates for permitting a triggering pulse to pass to the transistor 34 only when properly conditioned by a voltage on terminal 41. When transistor 34 is pulsed into conduction then transistor 35 is likewise biased into conduction by a drop of voltage on the lead 43 resulting from increased voltage drop across the load resistor 44 of transistor 34. An inductance 45, a condenser 46 and a resistor 47 constitute cross-coupling elements between the two transistors and function to time the pulse output which is produced while both transistors 34 and 35 are conducting such that after a predetermined time interval, the transistors will be again biased into non-conduction. Thus, a pulse of half-select current is caused to flow through the cores 40 upon the application of a timing pulse X applied to the terminal 42. Since two of the five single shot circuits constituting the core drive circuits 24 (FIG. 1) have received the appropriate "one" signals, two corresponding pulses will be produced simultaneously by two of the single shot multivibrators and therefore two simultaneous half-select pulses will be applied to the core matrix. Except for the complementing operation of the add-subtract gating circuit 26, the augend input signal is applied to condition a pair of single shot multivibrator circuits such that simultaneous half-select pulses will be generated when a Y-timing pulse from the timing pulse generator 23 appears.

From a consideration of FIG. 5, it becomes apparent that the first step in any arithmetic operation is to clear the core matrix by applying pulses simultaneously on all of the columns, the second step will be to enter the addend information by applying two half-select pulses to select and flip a row of the core matrix, and a final step is to restore a single core of the selected row by applying two simultaneous half-select pulses to a selected column of the core matrix.

Figures 6, 7:
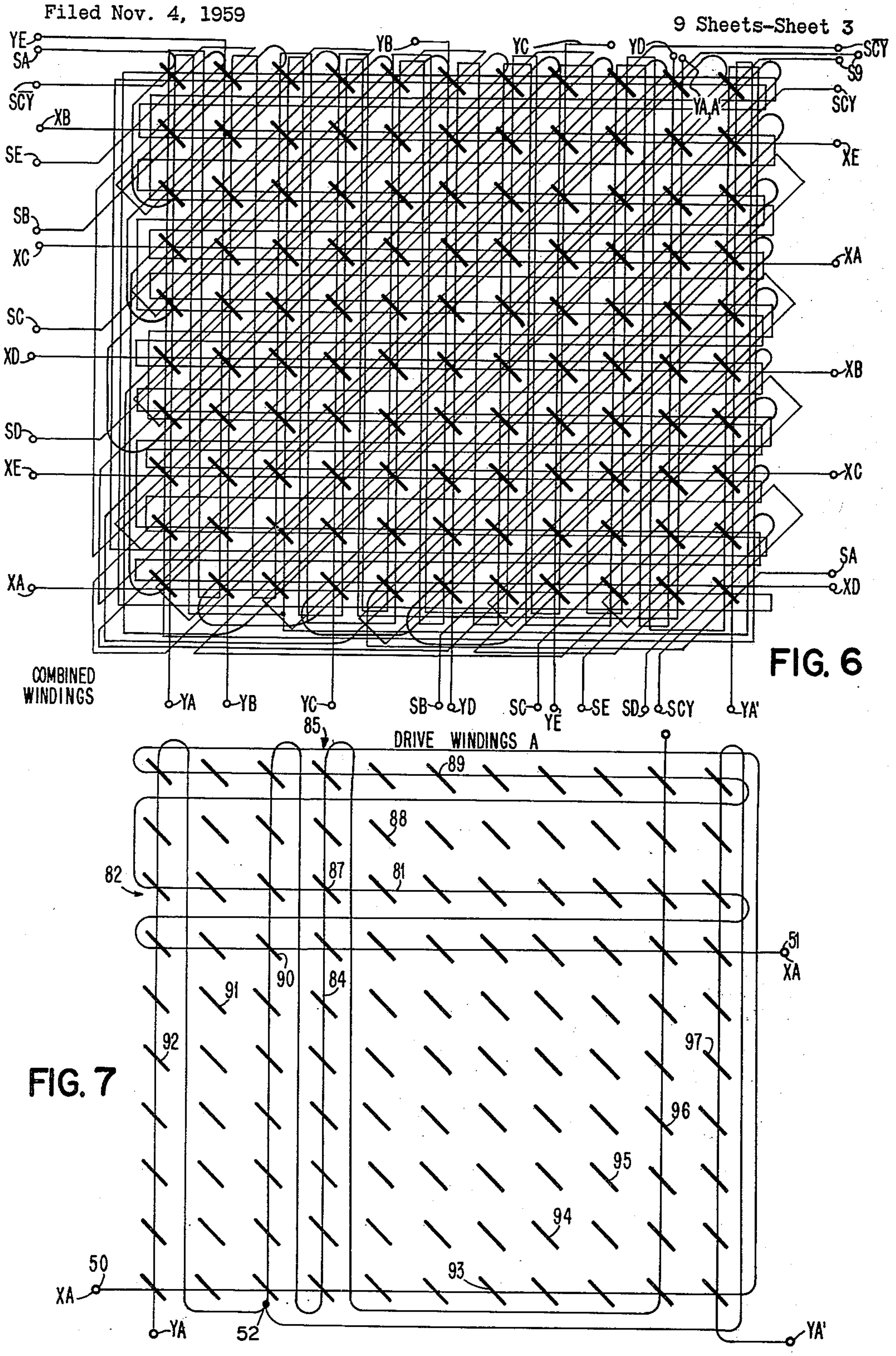
FIG. 6 is a complete winding diagram of the core matrix illustrated as a block in FIG. 1.
FIGS. 7 through 17 illustrate the various drive windings and sense windings included in the core matrix shown in FIG. 6.

FIG. 6 illustrates the core matrix showing all of the drive and sense windings associated therewith. It will be noted that the drive windings for selecting rows (horizontal lines of cores) are designated at their terminals by XA, XB through XE while the drive windings for selecting columns (vertical lines of cores) are designated as YA, YB, through YE. Similarly, the sense windings which extend diagonally through the matrix are designated as SA, SB, SC, SD and SE together with the carry sense windings which are designated as $\overline{SCY}$, SCY and S9.

Although FIG. 6 shows fully the winding arrangement for threading the core matrix 25, the operation of this core matrix may be more easily understood by considering the various windings separately and in simple combinations of pairs. With this in mind, FIGS. 7 through 17 have been provided to illustrate the various windings which, if taken together, would result in the configuration of FIG. 6. As a further aid to the understanding of this core matrix, one could reproduce FIGS. 7 through 17 on separate sheets of semi-transparent vellum paper such that various combinations of windings could be studied together by overlaying one of the sheets upon another.

FIG. 7 illustrates the configuration of the A-bit drive windings and it is seen that the XA winding commences at a terminal 50 and it extends from left to right through all of the cores of the top or zero line, the third or two digit line, the fourth or three digit line and the bottom or nine digit line ultimately terminating in the terminal 51. If one compares this with the table of FIG. 2 it becomes apparent that if a half-select current pulse were applied to the XA drive winding then all of the rows of cores would be half selected corresponding to the one bits in the column A, i.e. the uppermost or zero digit, the third row down representing the digit two, the fourth row down representing the digit three and the bottom row representing the digit nine. Thus, the XA winding constitutes a means for half selecting those rows of cores in strict accordance with the two-out-of-five code shown by FIG. 2. Likewise from a study of a configuration of the XB drive winding shown in FIG. 8 it will be noted that those rows of cores can be half selected in accordance with the B-bit column shown in FIG. 2. Likewise the XC drive winding of FIG. 9, the XD drive winding of FIG. 10, and the XE drive winding of FIG. 11 corresponds with the respective columns C, D and E of the two-out-of-five bit code of FIG. 2.

Figure 8:
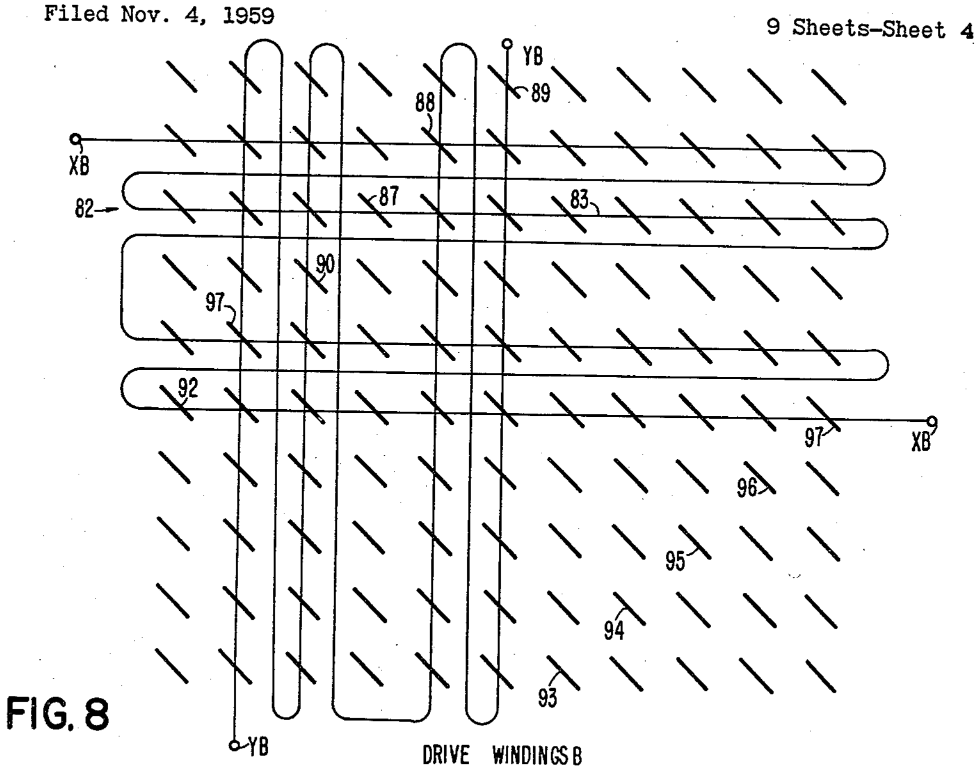
Figure 9:
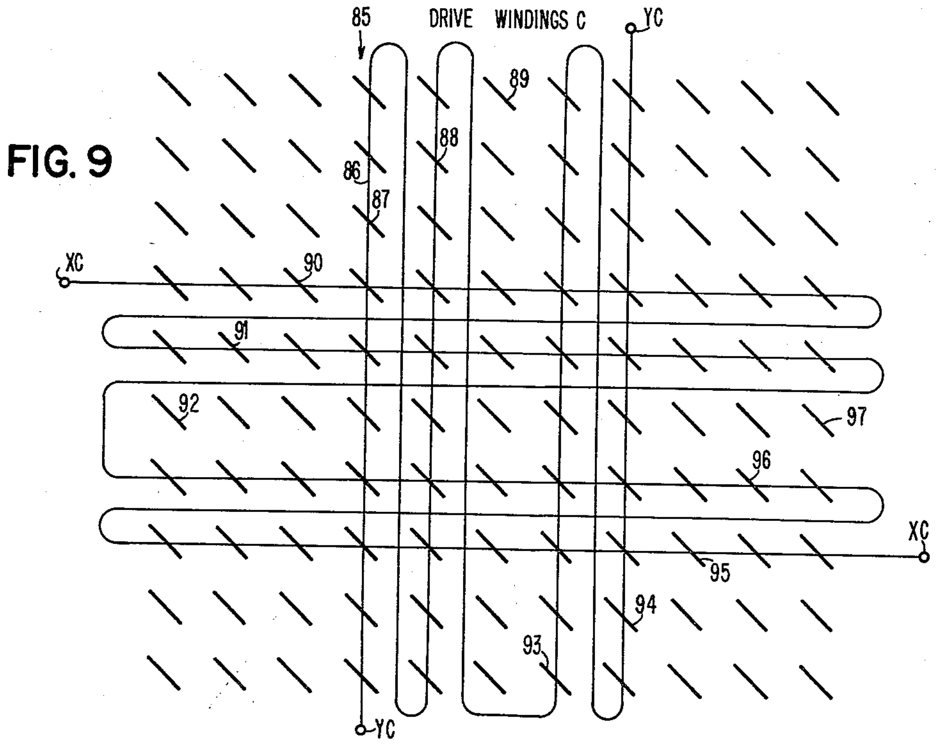
Figure 10:
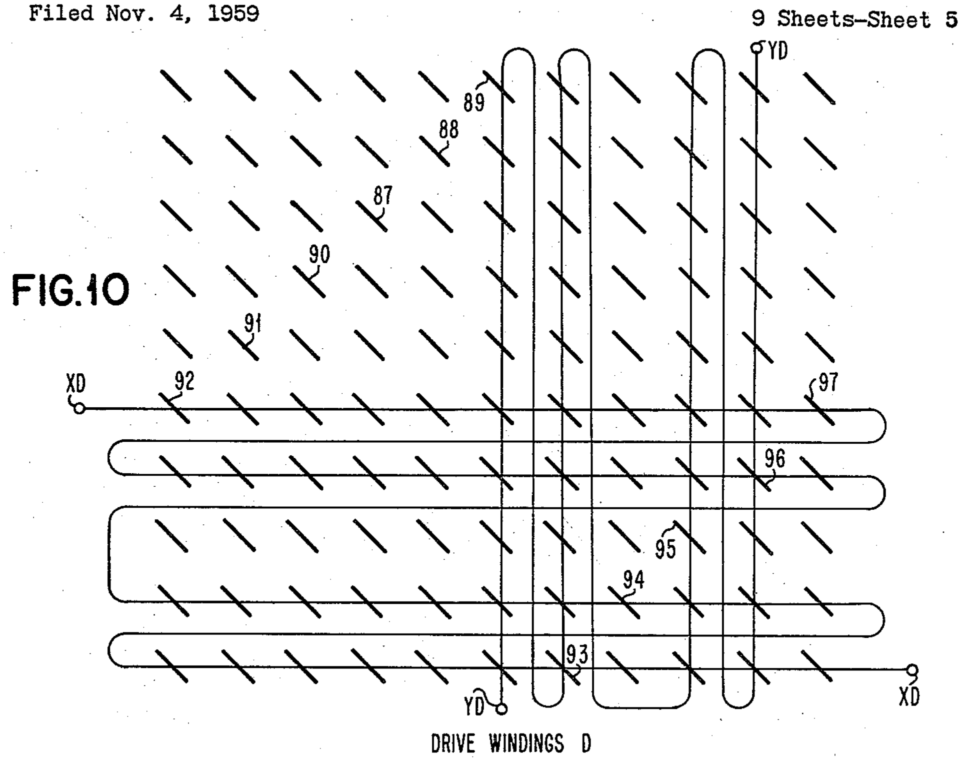
Figure 11:
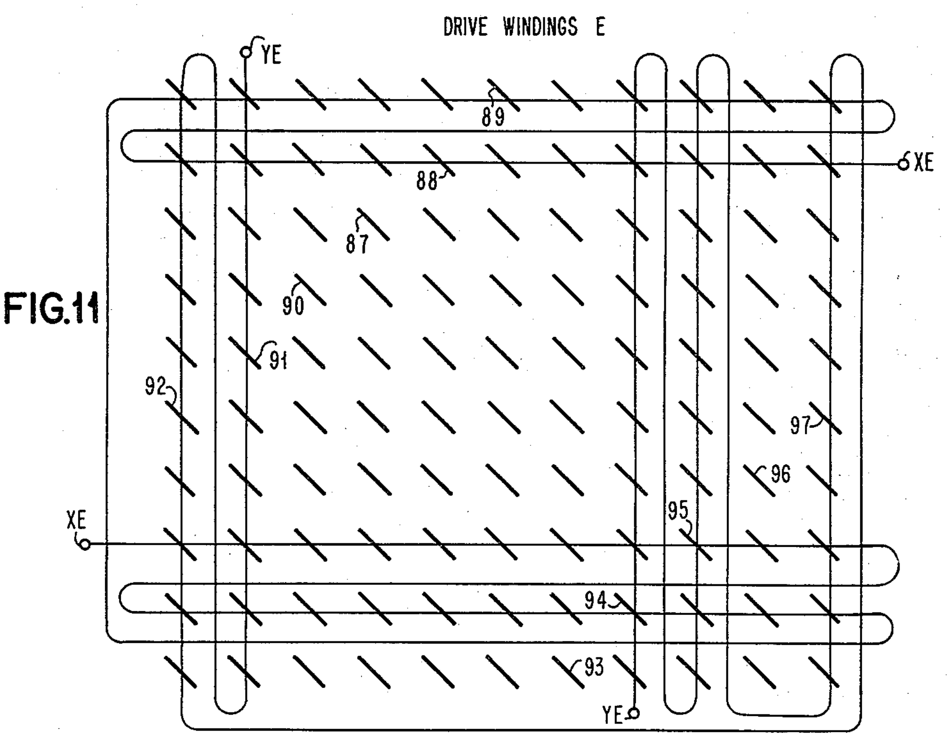
Figure 12:
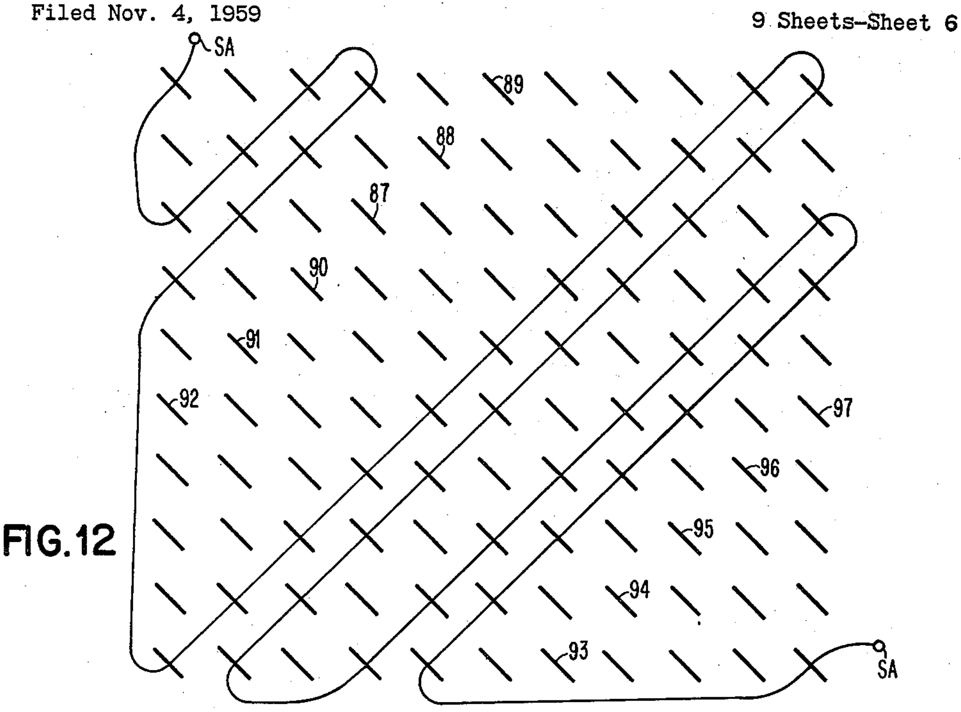
Figure 13:
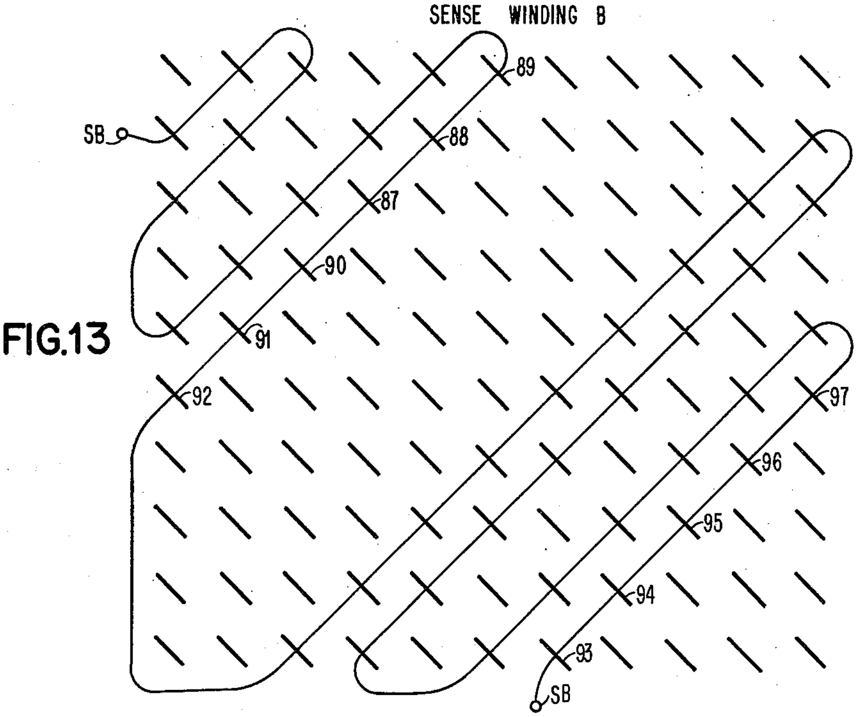
Figure 14:
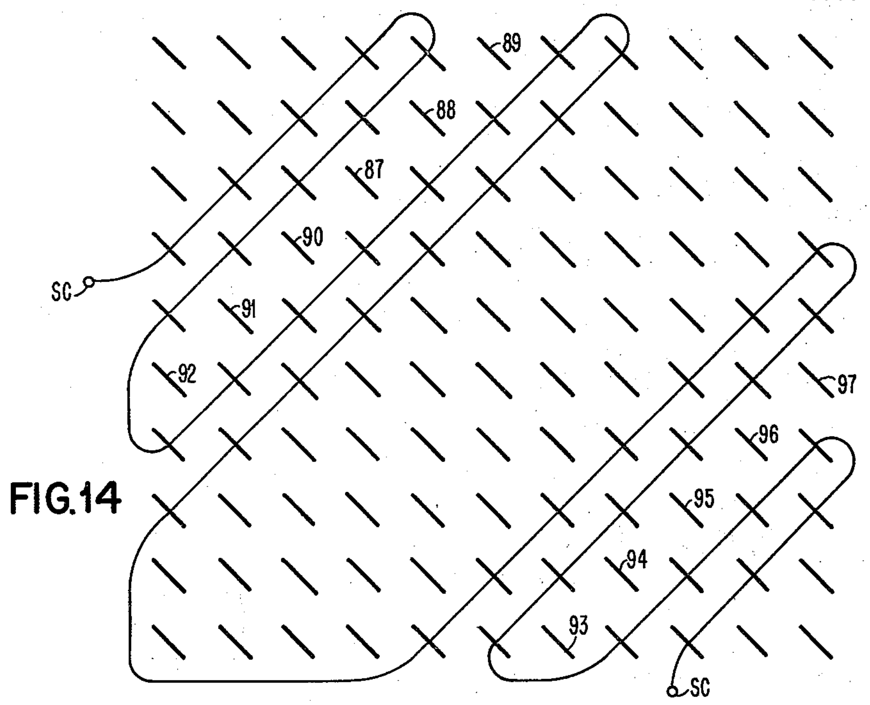
Figure 15:
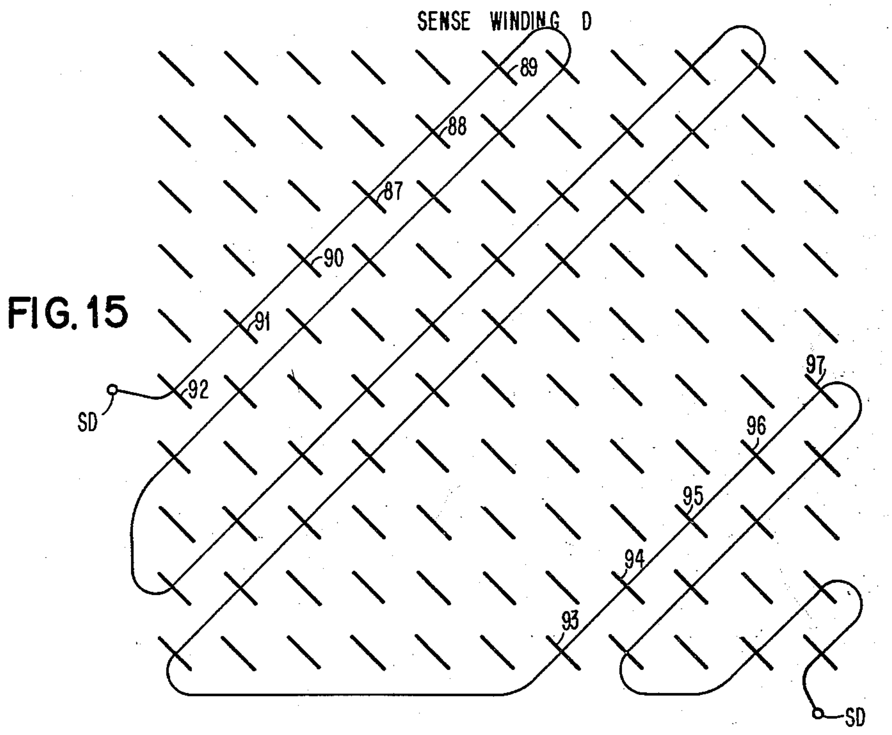
Figure 16:
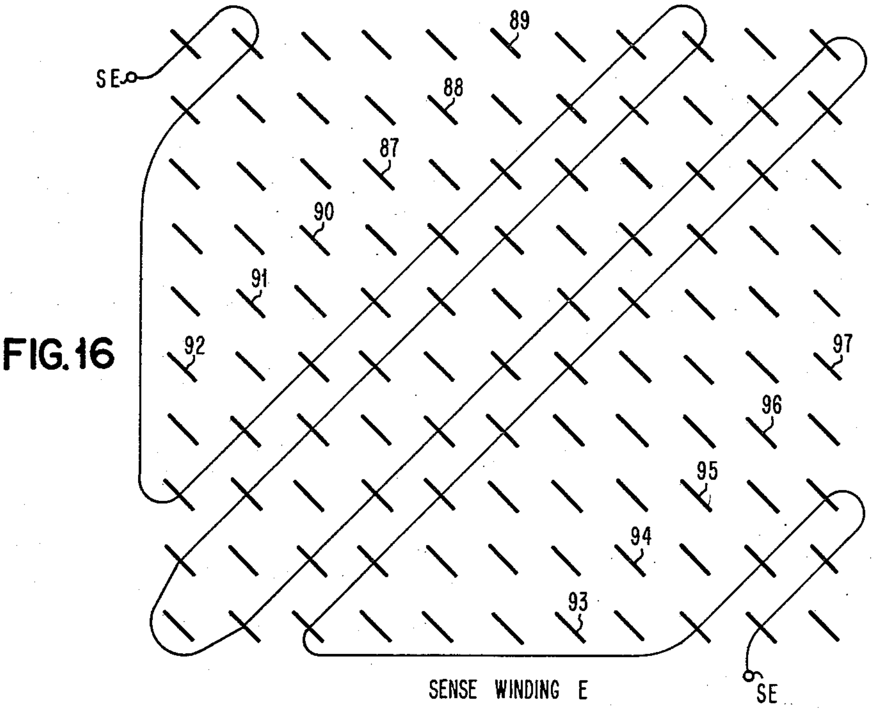

While the input signals are coded in the two-out-of-five bit code (FIG. 2), the selection of a particular row of the core matrix is accomplished by half selecting two windings and therefore, the only row of cores to be flipped by two X drive bits must be threaded by the two windings passing those drive bits. For example, if half-select pulses are passed through winding XA and winding XB, the row of cores to be selected will be the third from the top representing the decimal digit two. This may be easily seen if FIG. 7 and FIG. 8 are overlaid one upon the other and which of the horizontal rows contains two threaded windings is determined. More logically, it may be noted that from the combination FIGS. 7 and 8 or from FIG. 2 that the third row down representing the decimal two is the only row which receives half-select pulses from both the A winding and the B winding and consequently receives a full select current from the combination of the two windings.

While the core matrix contains ten rows representative of the ten decimal digits, it contains eleven columns which likewise represent the ten decimal digits, but wherein there is a redundancy in that the first and eleventh columns both represent the decimal zero digit. The column drive windings YA, YB, YC, YD and YE are generally similar in configuration and operation to the row drive windings discussed above. Thus, the YA, YB, YC, YD and YE windings follow generally the same code indicated by FIG. 2. For instance, the YB winding will half select those rows corresponding to the decimal digits one, two, four and five as may be seen in FIG. 8 or as may be implied from a study of the code in FIG. 2. However, to simplify an arrangement for developing carries which may be different in the case of addition and subtraction, the YA and YA' winding branches at point 52 (FIG. 7) such that if the YA winding is pulsed the zero column at the left will be half selected together with the two, three and nine digit columns, but if the YA' winding is pulsed with a half-select current this current will flow through the zero column to the right and through the two, three and nine digit columns. Thus, it is seen that regardless of which branch of the YA—YA' winding is pulsed, the two, three and nine will be half selected, but a difference occurs with regard to the zero columns.

FIG. 3 illustrates the circuit diagram for the add-subtract gating circuit 26 and the core drive circuits 29 which are shown in blocks in FIG. 1. The gating circuit 26 functions to pass the coded signals directly during addition, but to complement the coded signals for subtraction. During an addition operation the add-subtract trigger 28 will apply a positive bias to the add input terminal 55, FIG. 3. With a positive bias on terminal 55, AND gates 56, 57, 58 and 59 will be conditioned to pass the current pulses which may appear at the augend input terminals A, B, D and E and therefore, a signal applied to terminal A will pass through the AND gate 56 thence through an OR circuit 60 to condition a single shot multivibrator 61 whereby the multivibrator 61 will generate a half-select current drive pulse upon the application of a Y-timing signal applied to a terminal 62. The single shot multivibrator 61 and the other single shot multivibrators 63, 64 65, 66 and 67 may be of the type shown in FIG. 4.

As noted above, if the terminal 55 receives an appropriate voltage from the add-subtract trigger 28, then any signal appearing at the augend input terminal A will pass directly through and ultimately cause a current drive pulse to be applied to the terminal YA corresponding to the YA drive winding of the core matrix. Similarly, during an add operation augend input signals applied to terminal B will pass directly through the AND circuit 57, through an OR circuit 68 to cause a current drive pulse to be generated at the terminal YB, and signals applied to the input terminals D and E will pass through the respective AND circuits 58 and 59 through further respective OR circuits 69 and 70 to cause appropriate current drive pulses to be generated at output terminals YD and YE. It may be further noted that all signals applied to the input terminal C will be passed directly through an OR circuit 71 to cause a half-select current pulse to be generated at YC regardless of the condition of the add-subtract trigger.

Assume next that the add-subtract trigger is reversed in conduction state by a subtract command and that correspondingly an appropriate positive voltage is applied to a terminal 73 (FIG. 3) causing AND gates 74, 75, 76 and 77 to be conditioned for passing signals therethrough. If this is the case, any A bit signal appearing at the augend input 22 will be passed through the AND gate 76, the OR circuit 70 to cause a half-select current pulse to be generated by the single shot multivibrator 66 and passed to the terminal and core drive windings YE. From this we may deduce that the input A bit has been changed to an output E bit by the complement circuit 26. Conversely, an input E bit applied at the augend input 22 will be passed through the AND circuit 77 through an OR circuit 79 to cause a half-select current pulse to be applied to the YA core winding. Thus, it may be appreciated that the complement circuit 26 has caused the input E bit to become an output A bit during a subtraction operation. Similarly, an input B bit is passed through the AND circuit 75, the OR circuit 69 to become an output D bit, while an input D bit is passed through the AND circuit 74, the OR circuit 68 to become an output B bit. Regardless of the add-subtract commands, any signal applied to the C augend input 22 will pass directly through to become a YC pass select current. Thus, it is seen that the complementing operation causes the A and the E bits to be interchanged, further causes the B and the D bits to be interchanged but does not affect the C bits.

Referring again to FIG. 2 and considering the decimal digit zero we may conclude that a complement operation will cause a reversal of the A and the E bits, but since such a reversal does not affect the coded representation of zero, the complementing of a decimal zero results merely in another decimal zero. Likewise, considering the decimal five, we may note that reversal of the B and the D bits will not change the coded value of the digit which will still remain a decimal five. However, in the case of decimal one the E bit will become an A bit while the B bit will become a D bit and therefore, the complementing operation applied to the decimal one will result in a decimal nine. Continuing this line logic we will see that a complement of a decimal two results in a decimal eight, a complement of a decimal three results in a decimal seven, a complement of a decimal four results in a decimal six, etc. In each case the reversal of the A with the E bit together with the reversal of the B with the D bit accomplishes a tens complement of the augend input number.

From the foregoing it is seen that a two-out-of-five coded input to the addend will result in two half-select current pulses which will cause a selected row of cores to be flipped. Likewise a two-out-of-five coded augend input may produce a corresponding two half-select inputs for restoring a selected column to the initial flux state, or the augend input may be complemented such that two current pulses corresponding to the complement of the digit will restore a selected column of cores to its initial state. But since only a single core of a particular column was in a reversed flux state, then only a single intersecting core will actually experience a flux reversal upon the application of a Y-input pulse.

For example, if we are to add two and three, the addend signal would contain an A bit and a B bit (see FIG. 2) and therefore, a half-select current pulse would be passed by a conductor 81 (FIG. 7) which threads the row of cores third from the top 82 representative of a two and simultaneously, another half-select current pulse will pass through a line 83 (FIG. 8) from the winding XB which likewise threads the same row of cores 82. Thus, during the time of the X-pulse (see FIG. 5) all of the cores along the row 82 third from the top, will be reversed in state. During the next time of a Y-pulse (FIG. 5) half-select pulses will be applied to the Y-drive windings A and C in accordance with the code (FIG. 2) representative of a decimal three. The half-select current pulse in winding YA will flow through a line 84 which threads the cores in a column 85 (see FIG. 7). Simultaneously, a half-select pulse will flow through a line 86 (FIG. 9) which likewise threads the same column 85. Thus, it is seen that the cores of the column 85 all receive two half-select currents which are coupled at a polarity to drive the cores to the initial state of flux. However, since the core 87 (third from the top and fourth from the left) is the only core of column 85 having been flipped, it follows that this core 87 is the only core that will experience a flux reversal when the two half-select restoring drive pulses are applied to the column 85.

The reversal of the core 87 is indicative of a decimal five sum which results from the addition of two and three. By similar logic if we had added one and four the sum output would have resulted from the reversal of flux upon restoring a core 88, second from the top and fifth from the left, also representative of a decimal five sum. Similarly, if we had added a zero and a five, the sum output would have resulted from a reversal of flux in a core 89. Other combinations which may give a sum of five would be three plus two—core 90, four plus one—core 91, and five plus zero—core 92. In each of these foregoing examples, a sum five is generated without a carry, but if we consider the possibility of fives being generated with a carry, i.e., 15, then we may appreciate that nine plus six would result in core 93 reversing to produce an output, eight plus seven causes core 94 to produce an output, seven plus eight causes core 95 to produce an output, six plus nine causes core 96 to produce an output and file plus zero with a carry (five plus ten) would cause core 97 to produce an output. It may be appreciated that all of the cores which may reverse during Y-time to produce an output indicative of a five with no carry, lie along the diagonal extending from core 92 through core 89, while all of the cores which would reverse to produce a five with a carry, i.e., 15 will lie along the diagonal extending from core 93 to core 97. From FIG. 13 it may be seen that the sense windings SB will thread through all of the cores on both diagonals which may produce a five output (with or without a carry) and from FIG. 15 we further observe that sense winding SD likewise threads through all of the cores on both diagonals which may produce a decimal five output. Thus, if two numbers are combined to produce a five, output pulses will be produced in sense windings B and D which according to the two-out-of-five code (FIG. 2) are representative of a decimal five. By this same logic, we could work through other examples and determine that particular decimal sum outputs will be produced by the reversal of cores along particular diagonals of the matrix and that in each case there diagonals are threaded by two sense windings corresponding to the desired output bit in the two-out-of-five code of FIG. 2.

Figure 20:
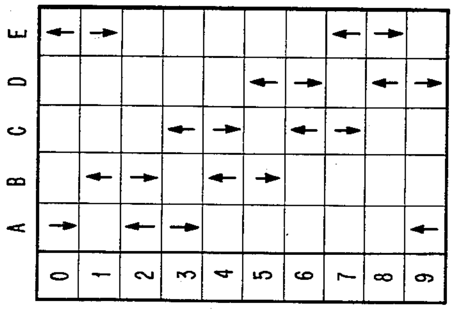
FIG. 20 is a table illustrating the various combinations of coded signals forming a sum output from the core matrix and illustrating the polarity of the signals which are impressed upon the sense amplifiers.

As may be observed in FIGS. 7, 8, 9, 10 and 11, the drive windings are threaded through the cores in a single direction. Thus, for example, in FIG. 8 the XB winding extends from one terminal in the upper left of the figure through the second row of cores from left to right, returns to the left side of the matrix, threads through the third row of cores from left to right and likewise threads through the fifth and sixth rows of cores from left to right. Similarly, the YB drive winding may be considered to commence at the terminal in the top center of the matrix, extends downwardly through the sixth column (from the left) of cores, thence return and extends downwardly through the fifth column of cores, and likewise extend downwardly through the third and second column of cores. Thus, half-select currents applied to the X drive windings will have the same polarity with respect to all of the cores threaded thereby, and similarly, the half-select current applied to the Y drive windings will have the same polarity (opposite to the X drive windings) with respect to all the cores threaded thereby. However, it is to be noted that the sense windings extend through the diagonal lines of cores alternately in opposite direction. Thus, the sense winding SA (FIG. 12) extends from the terminal at the upper left of the matrix downwardly and to the left through the first core, then upwardly and to the right through the third diagonal line of cores, thence downwardly to the left through the fourth diagonal line of cores, thence upwardly and to the right through the tenth diagonal of cores, thence downwardly and to the left through the eleventh diagonal row of cores, thence upwardly and to the right through the thirteenth diagonal row of cores, and thence downwardly and to the left through the fourteenth diagonal row of cores, and finally, upwardly and to the right through the final core which may be considered to be the twentieth line of cores. Because the sense winding essentially reverse themselves through alternate diagonal lines of cores, the output pulses generated by core reversals will be positive or negative in polarity for different windings. Each particular core is threaded by two sum sense windings in opposite directions and therefore, a positive voltage pulse will be produced in one of the sense windings while a negative pulse will be produced in the other. FIG. 20 is a table showing the two-out-of-five bit coded representation of output signals from the sense windings of the core matrix but with the further indications of positive and negative polarity illustrated by arrows pointing upwardly or downwardly. Thus, in our previous example, when a decimal five was sensed as the sum, it would be represented by a negative voltage pulse induced in the B sense winding indicated by downwardly pointing arrow in the B column corresponding to the decimal five (FIG. 20). On the other hand, the D sense winding would have induced therein a positive voltage pulse indicated by the upwardly pointing arrow in the column D corresponding to the five. In the event that a sum such as five is sensed and if there is no carry from a previous order of digits, then the polarity of the voltage signals may be disregarded, and any voltage indication may be considered a bit in the two-out-of-five code regardless of its polarity. However, if a carry has been generated in a previous order of digits, then the sum output signal will be modified and the polarity of the sensed voltage pulses will be used to produce the modified signal in a manner to be discussed later.

Figure 17:
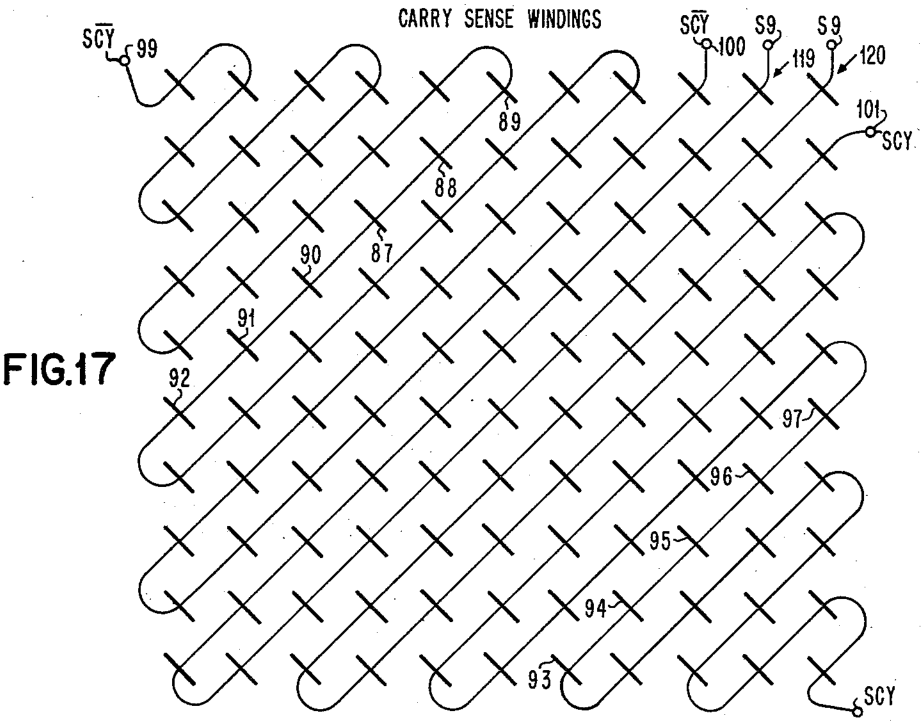

FIG. 17 shows the sense windings for determining the presence or absence of a carry signal. The winding $\overline{SCY}$ commences at a terminal 99 at the upper left of the matrix and threads back and forth through all of the cores in the first nine diagonal rows of cores terminating at a terminal 100. These diagonal rows of cores represent the output sums of the decimal digits zero through eight, and in no case will any of these sum outputs produce a carry for the next order of digits. Another sense winding SCY starts at a terminal 101 and threads through all of the diagonal lines of cores from the twelfth to the twentieth (counting from the upper left corner) and represent sums of the decimal numbers one through nine with carries, i.e., eleven through nineteen. Thus, if the sense winding SCY is impulsed by a core reversal, there shall always be a carry. The remaining two diagonal rows of cores, the tenth and eleventh are threaded by a winding designated as S9 and may produce a carry signal if other conditions are present, depending upon the polarity of the impulse from the winding, whether the operation is addition or subtraction, and whether there is a carry present from a previous order of digits. Thus, it is seen that if a voltage pulse occurs in the $\overline{SCY}$ winding then there is never a carry, if a voltage pulse occurs in the SCY winding there is always a carry, and if a voltage pulse appears in the S9 winding there may be a carry depending upon other conditions.

As shown in FIG. 1 the carries or no carries are stored in the carry trigger 32 from one operation to the next such that a carry produced by the addition of a first order of digits will modify the sum which is generated in the next order of digits. The carry trigger is controlled by the carry sense amplifier 31 which may be understood by reference to FIG. 19. The carry sense amplifier includes three transformers 104, 105, and 106 each of which has a primary winding coupled directly to the carry sense windings $\overline{SCY}$, S9 and SCY of the core matrix. A transformer 104 has two secondary windings 107 and 108 each having one terminal connected to ground and having the other terminal coupled through respective diodes 109 and 110 to the base connection of a transistor 111 which is an emitter follower. Essentially, the circuit including the transformer 104 and the two diodes 109 and 110 is a full rectifier and functions to pass a positive pulse to the base connection of the transistor 111 whenever a pulse appears (either positive or negative) from the sense winding $\overline{SCY}$. The upper connection 112 from the emitter follower 111 is coupled directly to the carry trigger 32 and will cause the carry trigger to assume a state of "no carry." Thus, any voltage pulse, either positive or negative which is induced into the sense winding $\overline{SCY}$ will cause the carry trigger to be turned off.

Similarly, the transformer 106 together with diodes 114 and 115 constitute a full wave rectifier which is directly coupled to the sense winding SCY and through an emitter follower transistor 116 will cause a voltage to appear at the output lead 117 which in turn will cause the carry trigger to turn on or assume the condition of "carry."

The transformer 105 has its primary directly connected to the conditional carry sense winding S9, and the polarities are arranged such that if any of the cores of the diagonal line 119 (indicative of a decimal nine, FIG. 17) are flipped, then a positive pulse will be produced in a secondary winding 122 of the transformer 105 (FIG. 19) and will be passed to a diode 123 while a negative pulse will be produced in a secondary winding 124 and will be passed to a diode 125. Obviously, the negative pulse will not pass through the diode 125 and therefore the transistor 111 will remain unaffected. Whether or not the positive pulse produced by the winding 122 will pass through the diode 123 depends upon whether a proper condition voltage is supplied to a terminal 126 by the add-subtract trigger. Such a conditioning voltage will be supplied if a subtract command is received and the add-subtract trigger 28 is in a conduction state corresponding to subtraction. Therefore, if a core of the diagonal line 119 (FIG. 17) is reversed, the carry trigger will be turned on (indicative of "carry") during subtraction operations.

Continuing our logic, we may note that if a core of the matrix diagonal line 120 (indicative of a decimal zero) is flipped, then a positive pulse will appear in the secondary winding 124 of the transformer 105 (FIG. 19) and will be passed through the diode 125 to the transistor 111 for turning the carry trigger off only if the add-subtract trigger is in a condition corresponding to addition. It may be further noted that if a nine is sensed by a core of the diagonal line 119 and that if the add-subtract trigger is in a condition for addition, then no signal whatsoever is passed through the output lead 112 or 117 to affect the carry trigger. Thus, if no carry were stored in the carry trigger from the addition of a previous order of digits, then a sum output of nine would not affect the trigger and the no-carry condition would remain. On the other hand, if a carry were present from a previous operation and we obtain a nine from an addition of our present order of digits, then the carry would continue to remain in the trigger for the next order of digits. Likewise in subtraction the sensing of a zero by one of the cores of the diagonal line 120 will not affect the carry trigger and therefore the condition of "carry" or "no carry" will remain for the next order of digits.

Figures 18, 19:
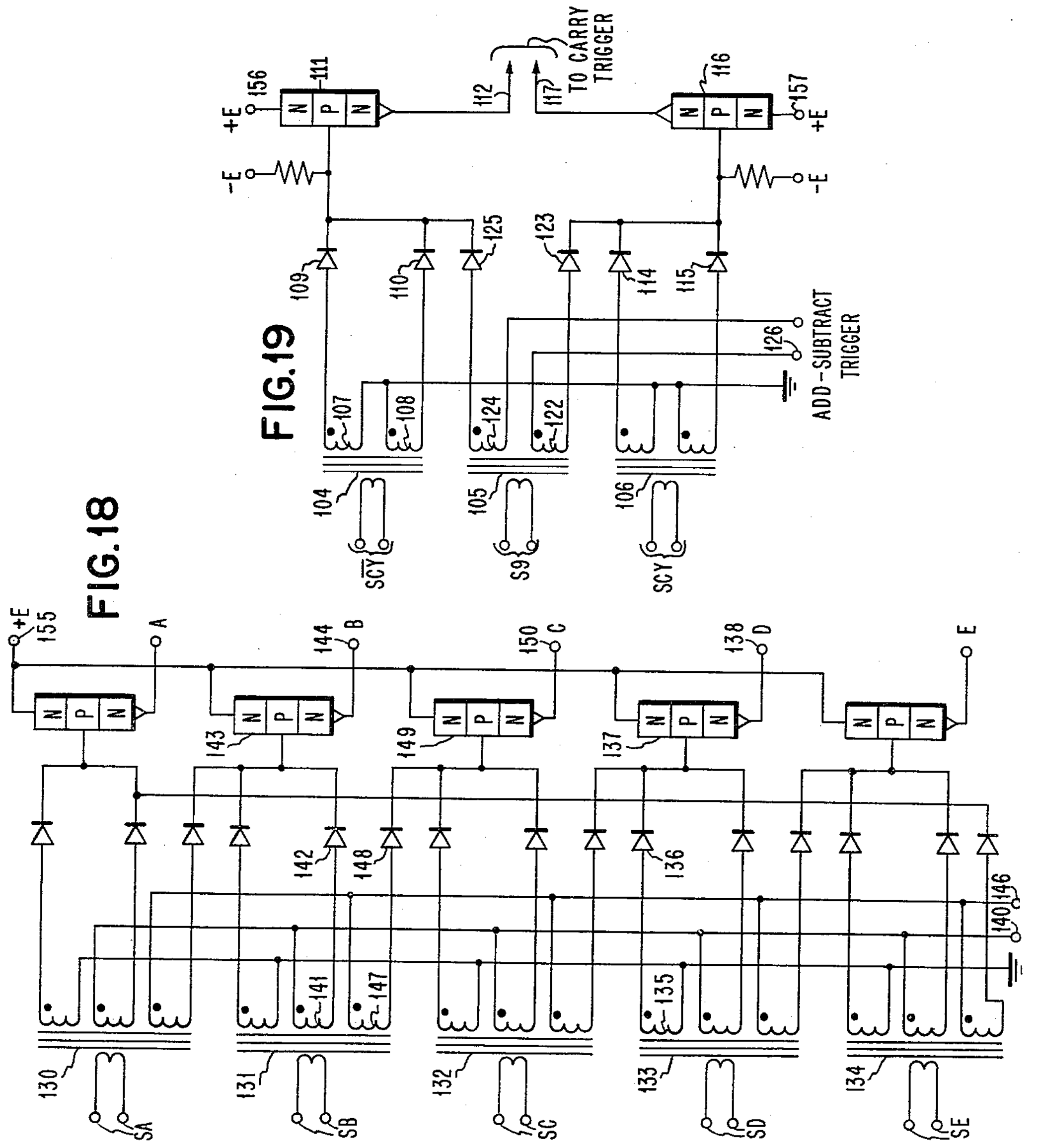
FIG. 18 is a circuit diagram for the sense amplifiers shown as a block in FIG. 1.
FIG. 19 is a circuit diagram of the carry sense amplifier shown as a block in FIG. 1.

The output signals from the core matrix and from the carry trigger are received by the sense amplifying circuits 30 which may be understood with reference to FIG. 18. As was previously discussed, a sum signal is generated by the flux reversal in a core which lies at the intersection of a selected row and a selected column of the core matrix. Each respective sense winding is connected to the primary winding of a respective transformer 130, 131, 132, 133 and 134, and positive or negative polarity pulses are induced in the secondary windings thereof in accordance with the direction in which the particular sense windings threaded the particular cores as shown by the upward and downward directions of arrows in FIG. 20. If we continue our former example wherein a decimal five without a carry has been sensed, then we may note from FIG. 20 that a negative pulse of voltage is generated in the sense winding SB and applied to the transformer 131 while a positive voltage pulse is generated in the sense winding SD and applied to the transformer 133. Considering first the positive pulse applied to the transformer 133, it will be appreciated that a corresponding positive pulse is induced in the secondary winding 135. Since one side of the secondary winding 135 is grounded, the positive pulse here induced will pass through a diode 136 to bias the base electrode of a transistor 137 connected as an emitter follower and will cause that transistor 137 to conduct and produce an output signal representative of a D bit at the terminal 138. Continuing our example further, it is to be remembered that we were adding two numbers to obtain the sum of five and therefore the carry trigger 32, conditioned for "no carry," will provide a proper conditioning voltage to the sense amplifier at a terminal 140. The voltage applied to the terminal 140 sets the level of the second primary windings of all of the respective transformers, and in our particular example the potential level of the primary winding 141 establishes a positive pulse from the negative input pulse (according to the polarities indicated by FIG. 20), which positive pulse will pass a diode 142 to the base electrode of a transistor 143, causing conduction therein which results in a B bit output on terminal 144.

If we consider only the conditions for "no carry," we will appreciate that the carry trigger conditions the terminal 140 such that any negative pulses applied to any of the primary windings of the transformers will be passed through the center secondary winding and the diode coupled thereto to cause an output bit. Therefore, when no carry is present, the transformers together with the first two secondary windings and the diodes coupled thereto constitute a full-wave rectifier which will pass the sense bit regardless of its initial polarity.

We will next assume that a carry has been developed by the addition of a previous order of digits and therefore the conditioning voltage is applied to a terminal 146 rather than the terminal 140. The central windings of the transformers are now rendered inoperative while the lower winding is set at a proper level such that any negative pulse received by the primary winding will produce a positive pulse to be passed by its respective diode. Thus, if we assume, as before, that our sensed sum was the decimal five, but in this case a carry was present from a lower order addition, then the negative pulse applied to the primary winding of the transformer 131 will induce a pulse in a secondary winding 147 which has been conditioned to a proper voltage level such that the pulse will pass through a diode 148 to the base electrode of a transistor 149. The transistor 149 is thus caused to conduct, thereby generating a C output bit at an output terminal 150 which, if taken together with the B output bit produced at the output terminal 138, will be representative of a decimal six rather than a decimal five. Thus, in our example where a sum of five has been sensed, this sum has been modified to become a decimal six by the presence of a carry.

The manner in which a carry may cause any decimal digit to be increased by one may be understood by reference to the table of FIG. 20. As heretofore discussed, when each of the ten decimal digits is sensed, a positive and a negative voltage pulse is generated on two respective sense windings of the core matrix as indicated by the direction of the arrows in FIG. 20. If no carry is present, then both of the bits undergo a full-wave rectification and the polarities are disregarded. On the other hand, if a carry is present, then the bit that is positive (upwardly pointing arrow in FIG. 20) will be passed directly to its corresponding output terminal, but the negative bit (downwardly extending arrow) will be passed to the next adjacent output circuit. Thus, if there is a carry present and the sum is a decimal zero, the downwardly pointing arrow in column A will result in a bit in column B, and thus the sum of zero will be modified to become a sum of one. In each case if the downwardly extending arrow were moved one column to the right in FIG. 20, the next higher digit will be produced (further realizing that the column A would logically lie next to the right from the column E such that the table of FIG. 20 closes upon itself as a cylinder).

Obviously, the sum sense amplifiers and the carry sense amplifiers must be rendered inoperative except when the Y-pulses are applied to enter the augend upon the core matrix to cause reversal of the single core indicative of a sum. There are numerous methods for rendering the sense amplifier inoperative except at those times when it is desired to sense the specific core. One such method would be the provision of a circuit responsive to the Y-pulses (FIG. 5) whereby the emitter follower transistors of FIGS. 18 and 19 are biased to cutoff at all times by an appropriate voltage applied to terminals 155, 156 and 157 during all times except the readout time of the core matrix.

Circuits for performing additions and/or subtractions may have either a serial or a parallel mode of operation. A serial adder combines the various orders of digits sequentially while storing the carries from one order of digits to the next. A parallel adder performs additions of the various orders of digits simultaneously in separate channels with the carries from one channel being passed to the next channel. The core matrix adder described herein is suitable for either mode of operation because the carries merely modify the output signals from the sense amplifiers and will have no effect upon the digits entered into the core matrix. As described and illustrated heretofore, the mode of operation is serial since the carries are stored in the carry trigger 32; however, this adder could be used in a parallel combination with other similar adders wherein the carries are passed directly from one adder to the next.

For example, if we add two and three, the addend two is entered as before by applying simultaneous half-select current pulses to the drive windings XA and XB. As previously discussed, the row of cores third from the top is the only row to receive two half-select pulses resulting in a full select current, and therefore, all of the cores in the third row which are not otherwise inhibited will be flipped. Simultaneously, inhibit current pulses are applied to the drive windings YB, YD and YE (the "zero" bits representing the augend three in the code of FIG. 2), and at least one inhibiting current pulse is caused to flow through all of the columns of cores except the fourth column from the left. This follows from a consideration of FIGS. 8, 10 and 11, wherein it may be noted that each of the columns except the fourth contains at least one conductor of the combined YB, YD and YE drive windings through which inhibiting currents will flow to prevent flipping of the cores. The core 87 is the only core which receives two positive half-select current pulses and no negative inhibit current pulses, and therefore, the core 87 will be flipped and as heretofore discussed, may be sensed as a decimal five resulting from the addition of the addend two and the augend three. By similar logic, we could follow through other examples of single step additions wherein one of the numbers to be added is entered into the core matrix by half-select currents applied to two drive windings and wherein the other number is entered simultaneously by inhibit currents applied to three intersecting drive windings in accordance with the two-out-of-five code of FIG. 2.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for adding two numbers both of which are represented by input signals in a two-out-of-five bit code, said apparatus comprising an addend input means for receiving one of the input signals, an augend input means for receiving the other of the input signals, addend and augend current pulse generating means associated respectively with the addend input means and the augend input means for generating half-select current pulses in accordance with the coded input signals, timing means controllably coupled to said current pulse generating means for energizing first said addend current pulse generating means and then said augend current pulse generating means, and a core matrix having addend drive windings extending in a first direction and having augend drive windings extending in a second direction to intersect the addend drive windings, said addend and augend drive windings linking the cores in opposite sense and each of said addend and augend drive windings being arranged according to the two-out-of-five bit code whereby two half-select current pulses from the addend will reverse the magnetic flux in a selected first-direction line of cores, and whereby two subsequently occurring half-select current pulses from the augend will restore the initial magnetic flux in a single core at the intersection of the selected first-direction line and a selected one of the second-direction lines.

2. Apparatus for selectively adding and subtracting two numbers both of which are represented by input signals in a two-out-of-five bit code, said apparatus comprising a first input means for receiving one of the input signals, a second input means for receiving the other of the input signals, a signal complementing means coupled to the second input means and operative to selectively reverse two pairs of bit input signals in the five bit code whereby signals representative of the tens complement of the second number are passed, first and second current pulse generating means associated respectively with the first input means and the complementing means for generating half-select current pulses in accordance with the first coded input signal and the complement of the second coded input signal timing means controllably coupled to said current pulse generating means for energizing first said first current pulse generating means and then said second current pulse generating means, and a core matrix having addend drive windings extending in a first direction and having augend drive windings extending in a second direction and sense to intersect the addend drive windings, each of said addend and augend drive windings being arranged according to the two-out-of-five bit code whereby the half-select current pulses from the first-direction will reverse the magnetic flux in a selected addend line of cores, and whereby the subsequently occurring half-select current pulses from the augend will restore the magnetic flux in a single core at the intersection of the selected first-direction line and a selected one of the second-direction lines corresponding to the tens complement of the second number.

3. Apparatus for adding two numbers both of which are represented by input signals in a two-out-of-five bit code and for generating an output signal in the two-out-of-five bit code representative of the sum of the two numbers, said apparatus comprising an addend input means for receiving one of the input signals, an augend input means for receiving the other of the input signals, addend and augend current pulse generating means associated respectively with the addend input means and the augend input means for generating half-select current pulses in accordance with the coded input signals, timing means controllably coupled to said current pulse generating means for energizing first said addend current pulse generating means and then said augend current pulse generating means, a core matrix having addend drive windings extending in a first direction and having augend drive windings wound in opposite sense extending in a second-direction to intersect the addend drive windings, said core matrix further having sense windings extending along diagonals and intersecting both the addend and the augend drive windings, each of said addend and augend drive windings being arranged according to the two-out-of-five bit code whereby two half-select pulses from the addend will reverse the magnetic flux in a selected first-direction line of cores, and whereby two subsequently occurring half-select current pulses from the augend will restore the initial magnetic flux in a single core at the intersection of the selected first-direction line and a selected one of the second-direction lines, and an output circuit coupled to the sense windings and operable to develop a two-out-of-five bit coded signal representative of the sum of the two numbers.

4. Apparatus for selectively adding and subtracting two numbers each of which is represented by five parallel input signals coded in a two-out-of-five bit code and for generating five parallel output signals likewise coded in the two-out-of-five bit code representative of the sum or difference of the two numbers, said apparatus comprising a first input means for receiving the five parallel signals representing a first of the numbers, a second input means for receiving the five parallel signals representative of the second of the numbers, a selected complementing means coupled to the second input means and operative to pass the five input signals directly for addition and further operative to reverse two pairs of the parallel signals to complement the second number for subtractions, a core matrix having addend drive windings extending in a first direction and having augend drive windings wound in opposite sense extending in a second direction to intersect the addend drive windings, drive means for first energizing two of the addend drive windings in accordance with the output from said first input means and for then energizing two of the augend drive windings in accordance with the output from said complementing means, said core matrix further having sense windings extending diagonally through the matrix and intersecting both the addend and the augend drive windings, each of the addend and the augend drive windings being arranged according to the two-out-of-five bit code whereby two half-select pulses from the first-direction will reverse the magnetic flux in a selected addend line of cores, and whereby two subsequently occurring half-select current pulses from the augend will restore the initial mvagnetic flux in a single core at the intersection of the selected first-direction line and a selected one of the second-direction lines, said sense windings being coded in the two-out-of-five bit code whereby the restoration of the selected core at the intersection of the addend and augend windings will develop current pulses in two of the five sense windings representative of the sum of the addend and augend in the two-out-of-five bit code, and another complementing means coupled to the sense windings and operative to pass the sense sum signal directly during addition and further operative to reverse two pairs of the parallel signals for complementing and developing a difference signal during subtractions.

5. Apparatus for adding two numbers and for generating a signal in five parallel output circuits representative of the sum of two numbers in a two-out-of-five bit code, said apparatus comprising a core matrix wherein magnetic cores are arranged in a rectangular configuration, an addend input means coupled to the core matrix and operable to reverse the magnetic flux polarity in a selected line of cores, an augend input means coupled to the core matrix and operative to subsequently restore a selected core to the initial flux state, a sensing means including five sense windings arranged according to the two-out-of-five bit code whereby the restoration of a flux to the initial state in the selected core will cause signal pulses to be generated in two of the sense windings, a carry sensing means including a sense winding linking cores of the matrix for developing a carry pulse signal, and gating means responsively coupled to the carry sense winding and operatively coupled to pass signals from the five sense windings to the five output circuits, said gating means being operable to pass the sensed signals directly to the respective output circuits in the absence of a carry signal, said gating means being further operable to transfer at least one of the output pulses from the respective output circuit to a different output circuit in the presence of a carry signal.

6. The apparatus according to claim 5 wherein the selected core links two of the five sense windings such that the induced signal pulse will be opposite in polarity in the two linking windings, said gating means being responsive to the polarity of the pulses whereby a pulse of a predetermined polarity will be transferred from its respective output channel in the presence of a carry signal.

7. Apparatus for receiving first signals representative of digits from a core matrix and second signals representative of the presence or absence of carries, and for modifying the first signals to adjust the digits in accordance with the presence or absence of carries, said apparatus comprising means for sensing positive bit polarities of said first signals and means for sensing negative bit polarities of said first signals, gating means capable of assuming one of two states in response to said second signals representative of the presence or absence of carries, said gating means being operatively connected to one of said means for sensing bit polarities of said first signals, first and second output circuits, means including said gating means for passing signals from the means for sensing bit polarities operatively connected to said gating means to said first output circuit when said gating means in in one of said states and for passing signals from the means for sensing bit polarities operatively connected to said gating means to said second output circuit when said gating means is in the other of said states, said means for sensing bit polarities not operatively connected to said gating means being operatively connected to one of said two output circuits, whereby signals of one polarity are passed to a predetermined output circuit regardless of the presence or absence of a carry signal and signals of another polarity are passed to the same output circuit when no carry signal exists and to another output circuit when a carry exists.

8. The apparatus according to claim 7 further comprising a carry control circuit controllably coupled to the gating means, said carry control circuit being operable to cause the gating means to transfer a signal of a first polarity to another output circuit when a carry is present, and when an addition operation is indicated, said carry control circuit being further operable to cause the gating means to transfer a signal of the opposite polarity into a further output circuit when a carry is present and when a subtraction operation is indicated.

References Cited in the file of this patent

UNITED STATES PATENTS

| | | |
|---|---|---|
| 2,364,540 | Luhn | Dec. 5, 1944 |
| 2,780,408 | Crosman et al. | Feb. 5, 1957 |
| 2,921,737 | Mao Chao Chen | Jan. 19, 1960 |
| 2,962,215 | Haynes | Nov. 29, 1960 |
| 2,967,665 | Einsele et al. | Jan. 10, 1961 |
| 2,995,303 | Collins | Aug. 8, 1961 |
| 3,018,961 | Ward | Jan. 30, 1962 |
| 3,028,505 | Rajchman | Apr. 3, 1962 |
| 3,040,986 | Andrews et al. | June 26, 1962 |

OTHER REFERENCES

Bloch, E., et al.: Biased Controlled Arithmetic and Translating Matrix, IBM Technical Disclosure Bulletin, vol. 1, No. 2, August 1958, pp. 34, 35.